(12) United States Patent
Kang et al.

(10) Patent No.: US 12,156,179 B2
(45) Date of Patent: Nov. 26, 2024

(54) COMMUNICATION APPARATUSES AND COMMUNICATION METHODS FOR SOFT-SEGREGATION OF RESOURCE POOL FOR V2X COMMUNICATION APPARATUSES

(71) Applicant: Panasonic Intellectual Property Corporation of America, Torrance, CA (US)

(72) Inventors: Yang Kang, Singapore (SG); Tien Ming Benjamin Koh, Singapore (SG); Lei Huang, Singapore (SG); Chan Wah Ng, Singapore (SG); Hong Cheng Michael Sim, Singapore (SG); Madhav Gupta, Singapore (SG); Hidetoshi Suzuki, Kanagawa (JP)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 476 days.

(21) Appl. No.: 17/603,855

(22) PCT Filed: Mar. 18, 2020

(86) PCT No.: PCT/SG2020/050144
§ 371 (c)(1),
(2) Date: Oct. 14, 2021

(87) PCT Pub. No.: WO2020/214087
PCT Pub. Date: Oct. 22, 2020

(65) Prior Publication Data
US 2022/0201655 A1    Jun. 23, 2022

(30) Foreign Application Priority Data

Apr. 17, 2019    (SG) .......................... 10201903473S

(51) Int. Cl.
*H04W 4/00*    (2018.01)
*H04W 72/02*    (2009.01)
(Continued)

(52) U.S. Cl.
CPC ....... *H04W 72/02* (2013.01); *H04W 72/0446* (2013.01); *H04W 72/1263* (2013.01); *H04W 72/563* (2023.01)

(58) Field of Classification Search
CPC ............. H04W 72/02; H04W 72/0446; H04W 72/1263; H04W 72/563; H04W 92/18;
(Continued)

(56) References Cited

U.S. PATENT DOCUMENTS

| | | | |
|---|---|---|---|
| 10,405,210 B2 * | 9/2019 | Clarke | .................. H04W 24/02 |
| 2008/0095055 A1 * | 4/2008 | Moulsley | .......... H04W 72/1221 370/234 |

(Continued)

FOREIGN PATENT DOCUMENTS

| | | |
|---|---|---|
| EP | 3 439 388 A1 | 2/2019 |
| JP | 2017537511 A | 12/2017 |
| WO | 2017/176099 A1 | 10/2017 |

OTHER PUBLICATIONS

Extended European Search Report, dated May 10, 2022, for European Application No. 20790697.5-1215, 11 pages.
(Continued)

Primary Examiner — Phuongchau Ba Nguyen
(74) Attorney, Agent, or Firm — Seed IP Law Group LLP

(57) ABSTRACT

The present disclosure provides communication apparatuses and communication methods for soft-segregation of resource pool for V2X communication apparatuses. The communication apparatuses include a communication apparatus which comprises circuitry, which, in operation, allocates a resource from a plurality of resources based on
(Continued)

resource allocation information, the resource allocation information indicative of a likelihood of allocating the resource from the plurality of resources based on a transmission profile relating to a signal; and a transmitter, which, in operation, transmits the signal to a target communication apparatus using the allocated resource.

3 Claims, 10 Drawing Sheets

(51) Int. Cl.
*H04W 72/0446* (2023.01)
*H04W 72/1263* (2023.01)
*H04W 72/563* (2023.01)

(58) Field of Classification Search
CPC ....... H04W 4/40; H04W 28/04; H04W 72/04; H04W 72/042; H04W 88/08; H04W 28/08; H04W 28/084; H04W 36/22; H04W 72/12; H04L 5/0007
See application file for complete search history.

(56) References Cited

U.S. PATENT DOCUMENTS

| | | | |
|---|---|---|---|
| 2013/0051356 A1* | 2/2013 | Hong | H04L 5/0053 370/329 |
| 2017/0303222 A1 | 10/2017 | Lee et al. | |
| 2017/0367105 A1* | 12/2017 | Kim | H04W 72/1268 |
| 2018/0049189 A1* | 2/2018 | Hugl | H04W 72/0446 |
| 2019/0021095 A1* | 1/2019 | Xi | H04W 4/40 |
| 2019/0246249 A1 | 8/2019 | Lee et al. | |
| 2020/0015255 A1* | 1/2020 | Khoryaev | H04W 72/21 |
| 2023/0232302 A1* | 7/2023 | Li | H04W 76/11 |

OTHER PUBLICATIONS

Qualcomm Incorporated, "QoS management and congestion control for sidelink," R1-1905013,. Agenda item: 7.2.4.6, 3GPP TSG RAN WG1 Meeting #96bis, Xian, China, Apr. 8-12, 2019, 5 pages.
3GPP TS 36.213 V15.4.0, "3rd Generation Partnership Project; Technical Specification Group Radio Access Network; Evolved Universal Terrestrial Radio Access (E-UTRA); Physical layer procedures (Release 15)," Dec. 2018, 550 pages.
International Search Report, mailed Jun. 30, 2020, for International Application No. PCT/SG2020/050144, 3 pages.

* cited by examiner

Fig. 7

COMMUNICATION APPARATUSES AND COMMUNICATION METHODS FOR SOFT-SEGREGATION OF RESOURCE POOL FOR V2X COMMUNICATION APPARATUSES

TECHNICAL FIELD

The following disclosure relates to communication apparatuses and communication methods for New Radio (NR) communications, and more particularly to communication apparatuses and communication methods for soft-segregation of resource pool for V2X communication apparatuses.

BACKGROUND

V2X communication allows vehicles to interact with public roads and other road users, and is thus considered a critical factor in making autonomous vehicles a reality.

To accelerate this process, 5G NR based V2X communications (interchangeably referred to as NR V2X communications) is being discussed by the 3rd Generation Partnership Project (3GPP) to identify technical solutions for advanced V2X services, through which vehicles (i.e. interchangeably referred to as communication apparatuses or user equipments (UEs) that support V2X applications) can exchange their own status information through sidelink (SL) with other nearby vehicles, infrastructure nodes and/or pedestrians. The status information includes information on position, speed, heading, etc.

In such V2X communications, there are at least two SL resource allocation modes being discussed by the 3GPP. In resource allocation Mode 1, SL resource(s) to be used by a UE for SL transmissions are scheduled by a base station (BS). In resource allocation Mode 2, the UE determines, i.e. the BS does not schedule, SL transmission resources within the SL resources configured by the BS/network or pre-configured SL resources. Particularly, the 3GPP study on resource allocation considers sensing and resource selection procedures for a Mode 2(a), in the context of a semi-persistent scheme where resource(s) are selected for multiple transmissions of different transmission blocks (TBs) and a dynamic scheme where resource(s) are selected for each TB transmission.

The following techniques are studied to identify occupied SL resources:
  Decoding of SL control channel transmissions
  SL measurements
  Detection of SL transmissions
The following aspects are studied for SL resource selection:
  How a UE selects resource for Physical Sidelink Control Channel (PSCCH) and Physical Sidelink Shared Channel (PSSCH) transmission (and other SL physical channel/signals that are defined)
  Which information is used by a UE for resource selection procedure As per the 3GPP Technical Specification TS36.213 section 14.1.1.6, a UE may sort all available "candidate single-subframe resource" using metric $E_{x,y}$:

For a candidate single-subframe resource $R_{x,y}$ remaining in a set $S_A$, the metric $E_{x,y}$ is defined as the linear average of S-RSSI measured in sub-channels x+k for k=0, ..., $L_{subCH}$−1 in the monitored subframes in Step 2 that can be expressed by:
$t_{y-P_{svp}*j}^{SL}$ for a non-negative integer j if $P_{rsvp\_TX} \geq 100$, and $t_{y-P_{rsvp}'\_TX*j}^{SL}$
for a non-negative integer/otherwise.

The UE moves the candidate single-subframe resource $R_{x,y}$ with the smallest metric $E_{x,y}$ from the set $S_A$ to a $S_B$. This step is repeated until the number of candidate single-subframe resources in the set $S_B$ becomes greater than or equal to total $0.2 \cdot M_{total}$.

There is thus a need for communication apparatuses and methods that can solve the above mentioned drawbacks to avoid collisions between different transmission types. Furthermore, other desirable features and characteristics will become apparent from the subsequent detailed description and the appended claims, taken in conjunction with the accompanying drawings and this background of the disclosure.

SUMMARY

One non-limiting and exemplary embodiment facilitates allocation of resources in 5G NR based V2X communications to avoid collisions between different transmission types.

In one aspect, the techniques disclosed herein provide a communication apparatus. For example, the communication apparatus can be a UE, which may be a communication module integrated or installed in a vehicle. The UE may be subscribed to communication services of a telecommunications operator/public land mobile network (PLMN) operator. The communication apparatus comprises circuitry, which, in operation, allocates a resource from a plurality of resources based on resource allocation information, the resource allocation information indicative of a likelihood of allocating the resource from the plurality of resources based on a transmission profile relating to a signal; and a transmitter, which, in operation, transmits the signal to a target communication apparatus using the allocated resource.

In another aspect, the techniques disclosed herein provide a communication method. The communication method comprises allocating, by a communication apparatus, a resource from a plurality of resources based on resource allocation information, the resource allocation information indicative of a likelihood of allocating the resource from the plurality of resources based on a transmission profile relating to a signal; and transmitting, from the communication apparatus to a target communication apparatus, the signal using the allocated resource.

It should be noted that general or specific embodiments may be implemented as a system, a method, an integrated circuit, a computer program, a storage medium, or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

Embodiments of the disclosure will be better understood and readily apparent to one of ordinary skilled in the art from the following written description, by way of example only, and in conjunction with the drawings, in which:

FIG. 7 shows an example of how a resource pool for a communication apparatus may be soft-segregated in accordance with a sixth embodiment of the 5G NR based V2X communications as shown in FIG. 1.

Figure 1:
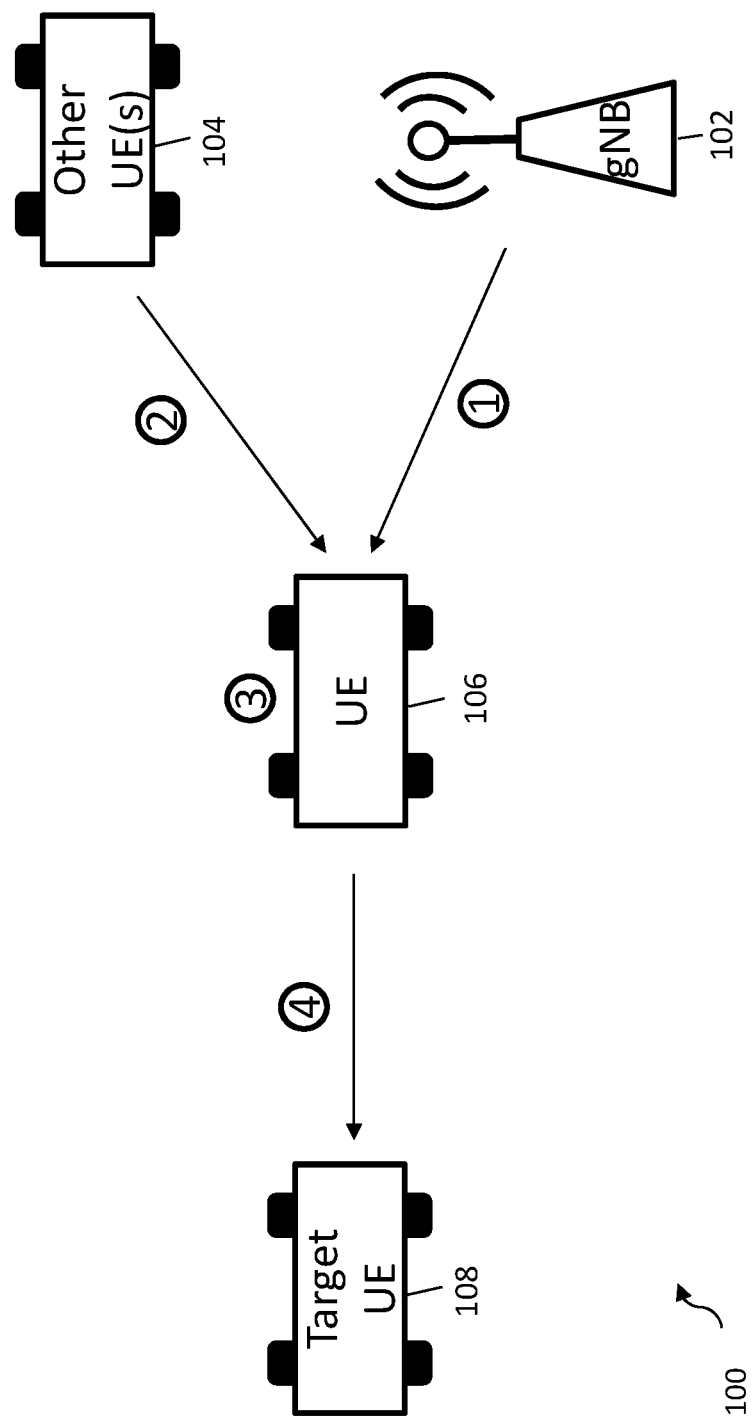
FIG. 1 shows a schematic example 100 of 5G NR based V2X communications that allows a communication apparatus to avoid collisions between different transmission types.

Skilled artisans will appreciate that elements in the figures are illustrated for simplicity and clarity and have not necessarily been depicted to scale. For example, the dimensions of some of the elements in the illustrations, block diagrams or flowcharts may be exaggerated in respect to other elements to help to improve understanding of the present embodiments.

DETAILED DESCRIPTION

Some embodiments of the present disclosure will be described, by way of example only, with reference to the drawings. Like reference numerals and characters in the drawings refer to like elements or equivalents.

As described above, a UE may determine the SL transmission resources within the SL resource pool configured by the BS/network or pre-configured SL resource pool to be used for its SL transmission of a signal to, for example, another UE.

Under Mode 2, for example, candidate resources for SL transmissions are selected based on randomization from a SL resource pool. There is no coordination method to mitigate or to avoid collisions for resource allocation, for example for NR SL Mode-2 UEs which autonomously select SL resource for transmission.

Some transmissions in NR for important functions such as emergency brake messages have a higher QoS (Quality of Service) requirement (lower latency, higher reliability, etc), and should not be choosing the same resource as a transmission for, for example, entertainment video streaming. In a situation where there are groupcast transmissions within a first group of UEs and within a second group of UEs, the groupcasts within the second group should be ignored by UEs of the first group since they are not the intended receivers.

In the following paragraphs, certain exemplifying embodiments are explained with reference to a V2X communications mechanism between a communication apparatus and one or more target communication apparatuses that advantageously allows the communication apparatus to mitigate or to avoid collisions in resource allocation. For the sake of simplicity, the SL resource pool may also be interchangeably referred to as a resource pool, resources or a plurality of resources in the present disclosure.

FIG. 1 depicts a schematic example 100 of a 5G NR based V2X communication that allows communication apparatuses to avoid collisions between different transmission types.

As described above, the communication apparatuses may be interchangeably referred to as UEs. The UEs may include, for example, communication modules integrated or installed in vehicles subscribed to communication services of one or more telecommunications/PLMN operators. For the sake of simplicity, the schematic example 100 as shown in FIG. 1 includes one UE/communication apparatus 106.

In the schematic example 100, the communication apparatus 106 may be subscribed to a telecommunication/PLMN operator operator (not shown) and communicates with a base station 102 of the telecommunication operator. In the present example, the base station 102 is a next generation NodeB (gNB) 102. It can be appreciated by those skilled in the art that the base station 102 can also be a ng-eNB, and may be connected via the NG interface to a 5G core network.

In various embodiments, the communication apparatus 106 includes a receiver, which in operation, receives resource allocation information from the base station 102, as shown in step 1 of FIG. 1, or from other UE(s) 104, as shown in step 2 of FIG. 1. The resource allocation information is indicative of a likelihood of allocating a resource from a plurality of resources based on a transmission profile relating to a signal. For the sake of simplicity, the receiver is not shown in FIG. 1. Alternatively, the resource allocation information may be pre-configured in the communication apparatus, such that the resource allocation information may be stored in a local memory (not shown in FIG. 1) of the communication apparatus 106 so that a receiver may not be required.

In various embodiments, the communication apparatus 106 also includes circuitry, which in operation, allocates a resource from a plurality of resources based on the resource allocation information, as shown in step 3 of FIG. 1. For the sake of simplicity, the circuitry is not shown in FIG. 1.

In various embodiments, the communication apparatus 106 also includes a transmitter, which in operation, transmits the signal to a target communication apparatus 108 using the allocated resource, as shown in step 4 of FIG. 1. For the sake of simplicity, the transmitter is not shown in FIG. 1.

As shown above, the resource allocation information may be indicative of a likelihood of allocating a resource from a plurality of resources based on a transmission profile relating to the signal. A transmission profile may include at least one of the following types: service endpoint (transmitter or receiver(s)), associate priority, type of cast (unicast, groupcast, broadcast), use case (platooning, advanced driving, extended sensor, remote driving, etc.), QoS requirements and other similar transmission types. For example, when the resource allocation information indicates a low likelihood for a resource, there is correspondingly a low likelihood that the circuitry of the communication apparatus 106 is going to allocate the resource, and a higher likelihood that the circuitry is going to allocate another resource instead. The plurality of resources may be the SL resource pool from which the communication apparatus 106 can allocate a resource for transmitting the signal. As the plurality of resources may also be available for resource selection by other UEs, it may be possible for collisions to occur, whereby a same resource is selected by one or more UEs. Therefore, in the present disclosure, the plurality of resources may be soft-segregated based on transmission profiles. The soft-segregation means that while the plurality of resources are divided into groups of resources such that each group favours a different transmission profile, every resource in the plurality of resources are still available for allocation for all transmission profiles. In other words, a signal associated with a transmission profile may have a higher likelihood of being allocated a resource from an area (e.g. an area with resources favouring the transmission profile relating to the signal) of the resource pool and a lower likelihood of being allocated a resource from other areas of the resource pool, as will be shown in FIG. 2.

Figure 2:
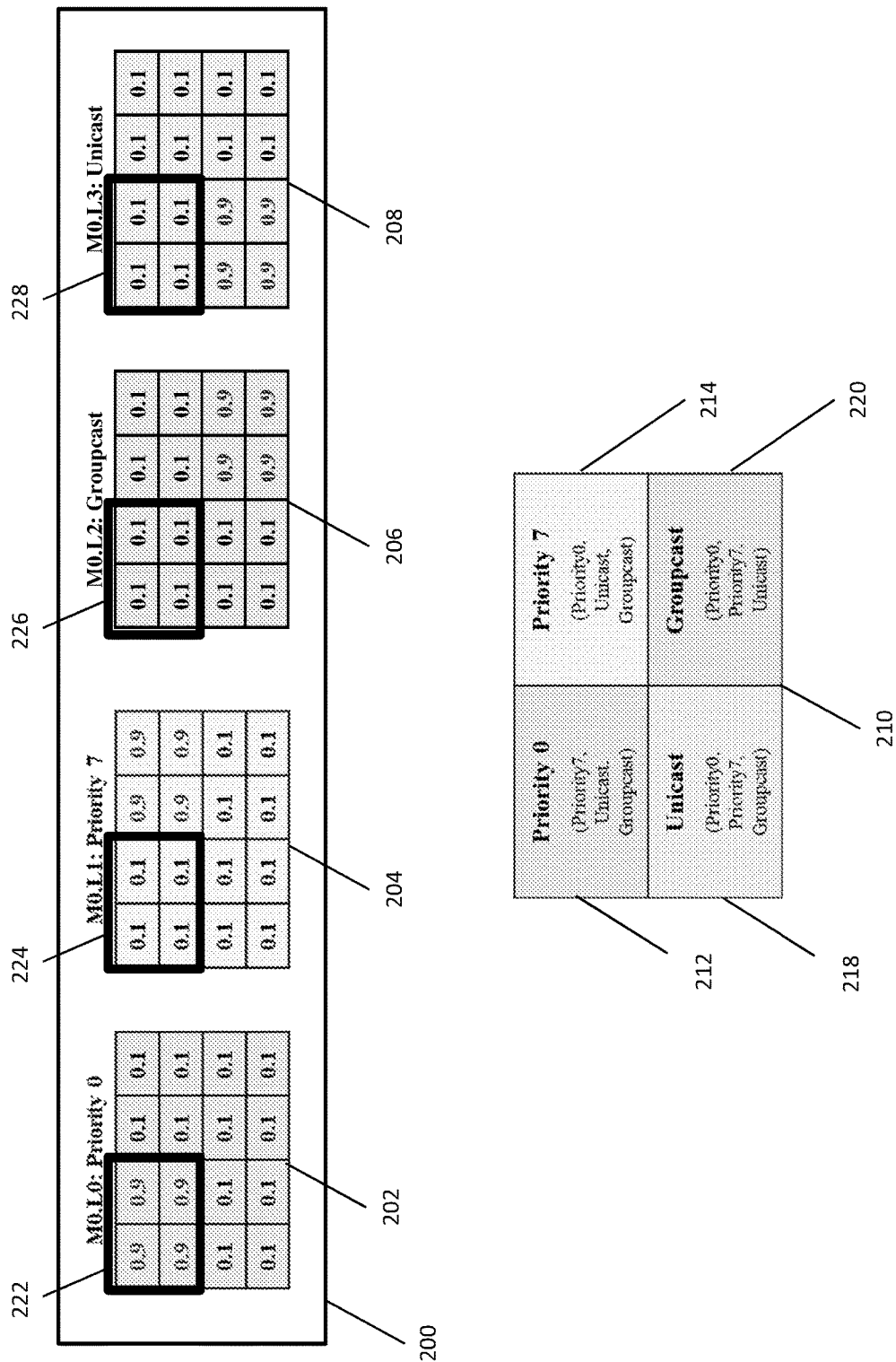
FIG. 2 shows an example of how a resource pool for a communication apparatus may be soft-segregated in accordance with a first embodiment of the 5G NR based V2X communications as shown in FIG. 1.

For example, example template 210 in FIG. 2 is an illustration of how a 4×4 array resource pool may be soft-segregated based on transmission profiles. Rectangle portion 212 of example template 210 may represent an area of resources in the resource pool that favour priority 0 transmissions, such that there is a higher likelihood of allocating a resource from rectangle portion 212 for a priority 0 transmission and a lower likelihood of allocating a resource from portion 212 for other transmission profiles such as a priority 7, unicast or groupcast transmission. Accordingly, based on the transmission profile that relates to the signal, the circuitry of the communication apparatus 106 allocates a resource from the plurality of resources, so that the transmitter of the communication apparatus 106 transmits the signal using the allocated resource.

In various embodiments, the resource allocation information may indicate a weighted value which is used to represent the likelihood of allocating the resource from the plurality of resources. The weighted value may be an integer, a probability value, a fraction, a threshold, a coefficient or other similar parameter that may be used to indicate a likelihood of a resource being allocated. The weighted value may be indicated by at least one bit of the resource allocation information. In other embodiments, the resource allocation information indicates a plurality of weighted values for each resource of the plurality of resources, each weighted value of the plurality of weighted values indicating a likelihood of allocating a resource based on a corresponding transmission profile. For example, the circuitry of the communication apparatus 106 may identify for each resource a weighted value from the plurality of weighted values based on the transmission profile of the signal, and allocates a resource based on the identified weighted values.

Referring to the example of FIG. 2, the resource allocation information may comprise four map profiles (202, 204, 206 and 208), each map profile corresponding to a different transmission profile. Map profile 202 corresponds to a priority 0 transmission, map profile 204 corresponds to a priority 7 transmission, map profile 206 corresponds to a groupcast transmission and map profile 208 corresponds to a unicast transmission. Each map profile is a 4×4 array, wherein an element (e.g. 0.1) in a map profile may be mapped to a resource in a 4×4 array resource pool and corresponds to a likelihood of allocating the resource. Each of the map profiles 202, 204, 206 and 208 soft-segregates the 4×4 resource pool in a same manner as shown in the example template 210. For example, rectangle portion 222 of map profile 202, rectangle portion 224 of map profile 204, rectangle portion 226 of map profile 206 and rectangle portion 228 of map profile 208 correspond to rectangle portion 212 of example template 210, whereby resources that are mapped to these rectangle portions have a higher likelihood of being allocated for a priority 0 transmission and a lower likelihood of being allocated for other transmission profiles such as a priority 7, unicast or groupcast transmission.

Further referring to example 2, there are 4 possible weighted values (i.e. a plurality of weighted values) for each resource of the 4×4 array resource pool, wherein each weighted value indicates a likelihood of allocating a resource based on a corresponding transmission profile. Taking the top leftmost resource of the 4×4 resource pool as an example, its plurality of weighted values are: 0.9 (from map profile 202), 0.1 (from map profile 204), 0.1 (from map profile 206) and 0.1 (from map profile 208), In the present example, a weighted value of 0.9 indicates a higher likelihood of being allocated compared to a weighted value of 0.1. For example, if the signal to be transmitted is a priority 0 transmission, the map profile that corresponds to priority 0 transmission i.e. map profile 202 will be mapped to the 4×4 array resource pool. Resources mapped to rectangle portion 222 of the map profile 202 have a high likelihood of being allocated for the signal transmission, as indicated by the weighted values of 0.9 in the rectangle portion 222. On the other hand, if the signal to be transmitted is a priority 7 transmission, the map profile that corresponds to priority 7 transmission i.e. map profile 204 will be mapped to the 4×4 array resource pool instead. The resources, now mapped to rectangle portion 224 of the map profile 204 instead, will have a low likelihood of being allocated for the signal transmission, as indicated by the weighted values of 0.1 in the rectangle portion 224.

When more than one transmission profiles relate to the signal, the weighted value may be based on the more than one transmission profiles relating to the signal. For example, the circuitry of the communication apparatus 106 may identify more than one weighted values based on the more than one transmission profiles, identify the highest weighted values among the identified more than one weighted values for each resource of the plurality of resources, and then allocate a resource from the plurality of resources based on the identified highest weighted values, as will be shown and explained in FIG. 3.

In some embodiments where the plurality of resources are soft-segregated, each weighted value is greater than zero so that each resource of the plurality of resources is available for allocation, and a higher weighted value indicates a higher chance of the resource being allocated. In some examples, a weighted value of zero indicates that the resource will not be allocated. In some other examples, a lower weighted value indicates a higher chance of the resource being allocated, and a weighted value of zero indicates a highest chance of the resource being allocated.

Figure 4:
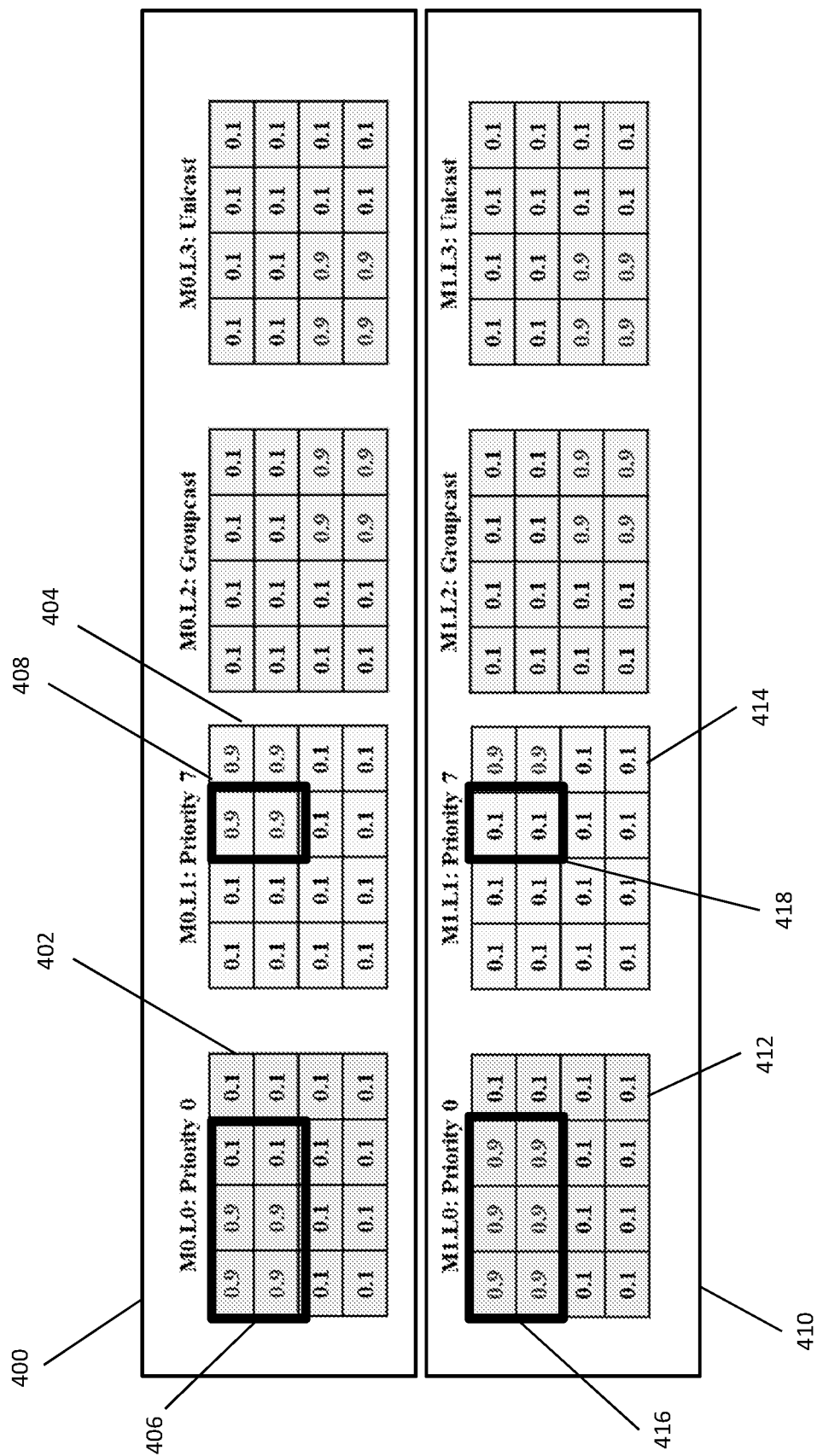
FIG. 4 shows an example of how a resource pool for a communication apparatus may be soft-segregated in accordance with a third embodiment of the 5G NR based V2X communications as shown in FIG. 1.

In various embodiments, the resource allocation information may comprise a plurality of maps, wherein each map of the plurality of maps comprises a plurality of weighted values for the plurality of resources, each weighted value of the plurality of weighted values indicating a likelihood of allocating a resource based on a corresponding transmission profile, as will be shown in FIGS. 4 to 8. For example, FIG. 4 shows an example of the resource allocation information indicating 2 maps 400 and 410. The weighted values of each resource for each transmission profile may be different across each map. The circuitry of the communication apparatus 106 may identify a map from the plurality of maps based on transmission information, wherein the transmission information may be indicative of radio environment conditions such as parameters or metrics of congestion level, CBR (Channel Busy Ratio), RSSI (Received signal strength indicator) or other service requirements. The transmission information may be received by the receiver of the communication apparatus 106 from the base station 102 or other UEs 104. Alternatively, the transmission information may be measurements of the radio environment conditions over the air by the communication apparatus 106. The circuitry may then identify for each resource a weighted value based on the transmission profile relating to the signal from the plurality of weighted values of the identified map, and then allocate a resource based on the identified weighted values. It can be understood that the gNB/base station 102 may send information relating to the resource pool to the communication apparatus 106, so that the communication apparatus 106 may configure the map and/or map profiles for the resource pool accordingly.

In some examples, the receiver of the communication apparatus 106 may receive the transmission information from the base station 102 or the UE(s) 104, the transmission information indicating one or more maps to avoid selecting. The circuitry of the communication apparatus 106 then selects a map from the plurality of maps, the selected map being different from the indicated one or more maps. In other examples, the transmission information may indicate a map to be selected, so that the circuitry of the communication apparatus 106 selects the indicated map from the plurality of maps. The circuitry then allocates a resource based on the plurality of weighted values of the selected map and the transmission profile relating to the signal. Advantageously, this enables coordination among UEs within a same cell to use a same/different map according to different situations.

In various embodiments, a map may be signalled via radio resource control (RRC) to the communication apparatus 106 or pre-configured in the communication apparatus 106 in abstract syntax notation one (ASN.1). In various embodiments, a map may be applied onto the NR sidelink resource pool periodically with a fixed time reference. Referring to the example of FIG. 7, the fixed time reference is at slot 0 of resource pool 704, which is a fixed time from which map profile 702 is periodically applied to the resource pool. In such embodiments, every UE may use the same fixed time reference of the map for resource selection, so that every UE has the same/similar concentration areas for different transmission types. However, different UEs may apply a different time offset from the fixed time reference using different resource selection windows, as will be shown in FIG. 7. In some examples, the resource allocation information may indicate a weighted value based on the time offset from the fixed time reference, the weighted value being used to represent the likelihood of allocating the resource from the plurality of resources. In other examples, the receiver of the communication apparatus 106 may receive transmission information from a base station 102 that is indicative of the fixed time reference, and the circuitry in operation selects a time offset, wherein the resource allocation information indicates a weighted value based on the selected time offset from the fixed time reference.

As described above, a target communication apparatus may be interchangeably referred to as a target UE. A target communication apparatus can be a communication module integrated or installed in a vehicle that has a direct connectivity with the communication apparatus 106. Such a direct connectivity is considered a unicast level connection between the target communication apparatus and the communication apparatus 106.

Alternatively, a target communication apparatus can be a communication module integrated or installed in a member vehicle of a platoon that the communication apparatus 106 belongs to. For example, the communication apparatus 106 may form a platoon with a plurality of target communication apparatuses. In the platoon, the communication apparatus 106 may not have a unicast level connection with the respective individual target communication apparatuses, but instead have a group level connection with a plurality of target communication apparatuses (not shown) to the platoon.

In some embodiments, the communication apparatus 106 may be connected to a target communication apparatus 108 via a unicast level connection. The unicast level connection may be a sidelink-based Access Stratum (AS) level connection that exists independently of existing RRC connections between the base station 102 and the communication apparatus 106 or the target communication apparatus 108.

In some alternative embodiments, the communication apparatus 106 may be connected to a plurality of target communication apparatuses that include the target communication apparatus 108. The communication apparatus 106, the target communication apparatus 108, and the other target communication apparatuses (not shown) may form a platoon and interconnected via a groupcast level connection. For example, the groupcast level connection may be dependent on an existing connection to a group/cluster head vehicle (e.g. the communication apparatus 104) or alternatively based on some metric depending upon the presence of other group members. The groupcast level connection may be a sidelink-based Access Stratum (AS) level connection that exists independently of existing RRC connections between the base station 102 and the communication apparatus 106, the target communication apparatus 108 or the other target communication apparatuses.

It is appreciable to those skilled in the art that, in other embodiments, the target communication apparatus 108 may have a unicast level connection with the communication apparatus 106. In addition to the target communication apparatus 108 and the other target communication apparatuses (not shown), the platoon may comprise more group members (i.e. target communication apparatuses) that are not shown in FIG. 1.

In some embodiments, the communication apparatus 106 is connected to the target communication apparatus 108 via a unicast level connection. As such, there is a presence of an AS level connection between the communication apparatus 106 and the target communication apparatus 108.

In some other embodiments, the communication apparatus 106 is connected to a plurality of target communication apparatuses that include the target communication apparatus 108 via a groupcast level connection. As such, there is a presence of an AS level connection between the communication apparatus 106 and the plurality of target communication apparatuses. In these embodiments, the communication apparatus 106 and the plurality of target communication apparatuses may form a platoon.

Figure 8:
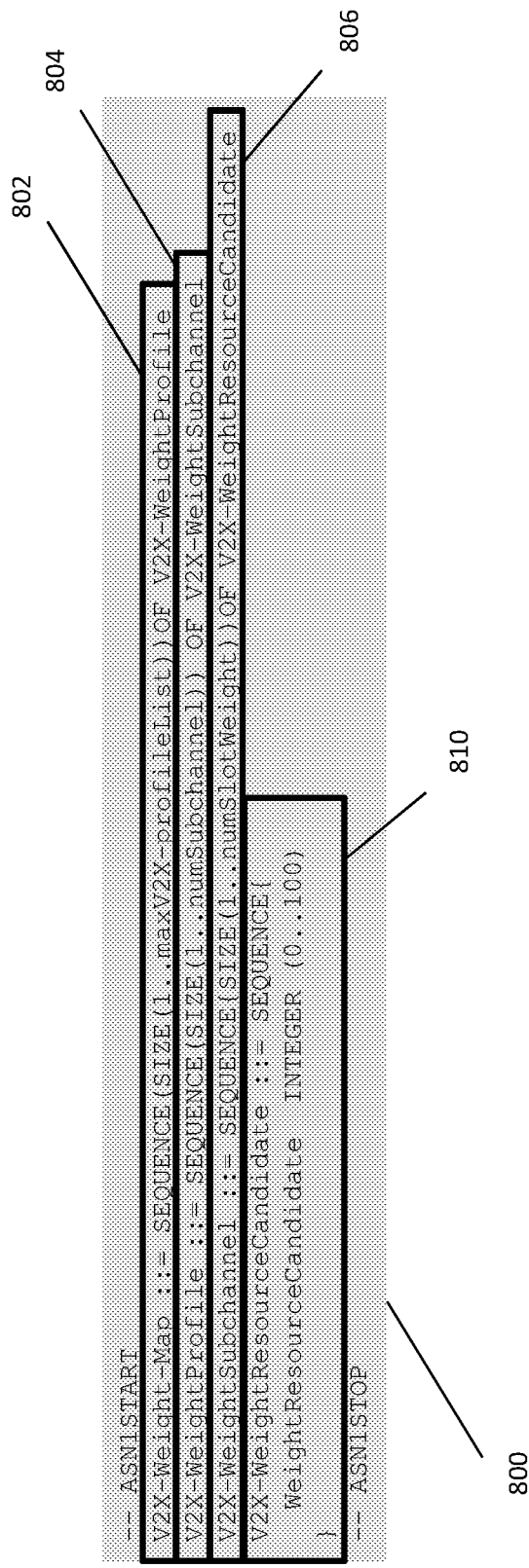
FIG. 8 shows an example of dedicated signaling for transmitting information from a base station or a UE to a communication apparatus.

In the present disclosure, the receiver of the communication apparatus 106 may receive the resource allocation information from the base station 102 and/or the UEs 104 via a dedicated or non-dedicated signaling. For example, the dedicated signaling may include a radio resource control (RRC) signaling, such as a RRCReconfiguration message as shown in FIG. 8, while a non-dedicated signaling may include transmission of SIBs (system information blocks).

Likewise, the transmitter of the communication apparatus 106 may transmit the signal to the target communication apparatus 108 and/or a plurality of target communication apparatuses via another dedicated signaling. For example, the other dedicated signaling may include a RRC signaling, a physical downlink control channel (PDCCH) signaling, or an application specific signaling (e.g. a car camera streaming application carries information about radio resources that can be used by another vehicles within a certain proximity or by other vehicles in a platoon).

FIG. 2 shows an example of how a resource pool for a communication apparatus may be soft-segregated, in accordance with the present disclosure.

A map 200 may be configured for the resource pool of the communication apparatus 106, either by pre-configuration or from gNB scheduling, for allocation of resources. In the present example, the map 200 consists of 4 map profiles (namely 202, 204, 206 and 208), each profile corresponding to a different transmission profile. Map profile 202 corresponds to a priority 0 transmission, map profile 204 corresponds to a priority 7 transmission, map profile 206 corresponds to a groupcast transmission and map profile 208 corresponds to a unicast transmission. It will be understood that more transmission profiles may be possible. In the present example, the resource pool of the communication apparatus 106 is represented as a 4×4 array. Accordingly, each map profile is a 4×4 array, wherein an element (e.g. 0.1) in a map profile may be mapped to a resource in the 4×4 array resource pool, and corresponds to a likelihood of allocating the resource in the 4×4 array resource pool. It can be understood that the actual size of the resource pool can be much larger than a 4×4 array, and each of the map profiles 202, 204, 206 and 208 may correspondingly be much larger as well. Similarly, it can be understood that the actual size of the resource pool can be smaller than a 4×4 array, and each of the map profiles 202, 204, 206 and 208 may correspondingly be smaller as well.

Each element in the map profile shows a likelihood of allocating a corresponding resource. The likelihood of allocating a resource may be represented by, for example, a weighted value. The weighted values as shown in the map profiles of a map therefore form a plurality of weighted values, wherein each weighted value of the plurality of weighted values indicates a likelihood of allocating a resource based on a corresponding transmission profile. For example, there are four map profiles (202, 204, 206 and 208), there are 4 possible weighted values (i.e. a plurality of weighted values) for each resource of the 4×4 array resource pool, wherein each weighted value indicates a likelihood of allocating a resource based on a corresponding transmission profile. Taking the top leftmost resource of the 4×4 resource pool as an example, its plurality of weighted values are: 0.9 (from map profile 202), 0.1 (from map profile 204), 0.1 (from map profile 206) and 0.1 (from map profile 208), Each of the map profiles 202, 204, 206 and 208 soft-segregate the resource pool of the communication apparatus 106 according to each of their corresponding transmission profile. An example of the soft segregation arrangement can be seen in an example template 210, which shows the areas (for each map profile 202, 204, 206 and 208) where each transmission type is concentrated: in the present example, resources for a priority 0 transmission are concentrated in the rectangle portion 212, resources for a priority 7 transmission are concentrated in the rectangle portion 214, resources for a groupcast transmission are concentrated in the rectangle portion 216, and resources for a unicast transmission are concentrated in the rectangle portion 218. For example, in map profile 202 which corresponds to priority 0 transmission profile, each of the elements whose location corresponds to the rectangle portion 212 has a weighted value of 0.9, while the remaining elements have a value of 0.1 each. In the present example, an element with a weighted value of 0.9 indicates that its corresponding resource is 9 times more likely to be allocated as compared to one with a weighted value of 0.1. It will be understood that the weighted value may be an integer, a probability value, a fraction, a threshold, a coefficient or other similar parameter that may be used to indicate a likelihood of a resource being allocated. The weighted value may be indicated by at least one bit of the resource allocation information.

Resource allocation information comprising the map 200 may be preconfigured in the communication apparatus 106. Alternatively, a receiver of the communication apparatus 106 may receive the resource allocation information comprising the map 200 from the base station 102 or other communication apparatus 104. The circuitry of the communication apparatus 106 may then allocate a resource from the resource pool based on the resource allocation information and a transmission profile relating to a signal. For example, assuming that the signal to be transmitted is a priority 7 transmission, the circuitry of the communication apparatus accordingly allocates a resource from the plurality of resources based on the map profile that corresponds to priority 7 transmission. In the present example, the map profile 204 is thus used by the circuitry for the allocation of resources, wherein each of the resources located at the rectangle portion 214 on map profile 204 has a higher chance of being allocated (as shown by the weighted value of 0.9 for each element within rectangle 214, as opposed to the weighted value of 0.1 for each other element). The transmitter of the communication apparatus 106 then transmits the signal to the target apparatus 108 using the allocated resource. It can be understood that the gNB/base station 102 may send information relating to the resource pool to the communication apparatus 106, so that the communication apparatus 106 may configure the map 200 and/or map profiles 202, 204, 206 and 208 for the resource pool accordingly.

Advantageously, the chances of collision between different transmission types over the air can be lowered, and the QoS may also be improved. Further, the soft segregation of resources as shown in FIG. 2 still allows all resources in the resource pool to be available for allocation by the circuitry of the communication apparatus 106.

Figure 3:
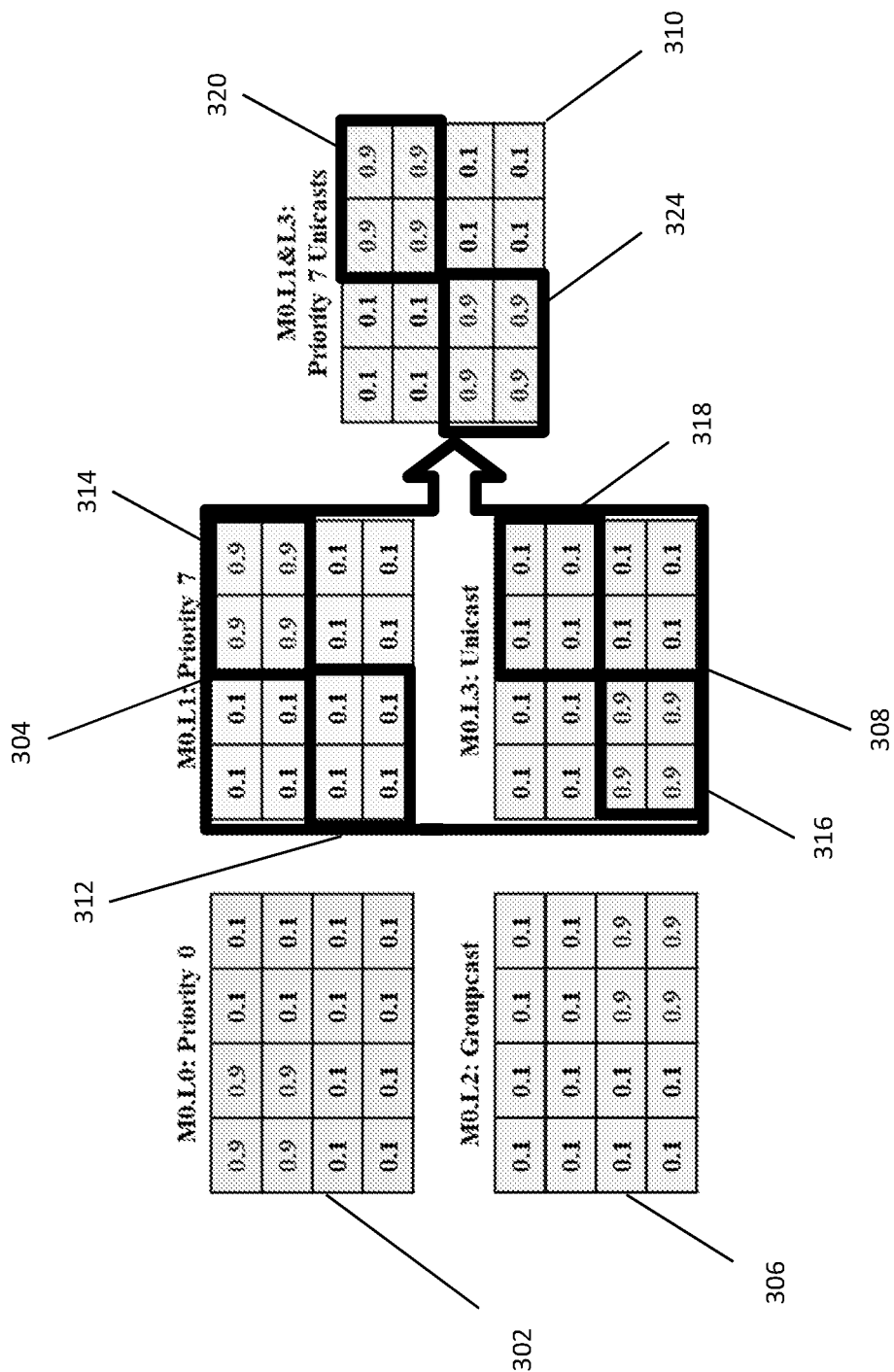
FIG. 3 shows an example of how a resource pool for a communication apparatus may be soft-segregated in accordance with a second embodiment of the 5G NR based V2X communications as shown in FIG. 1.

FIG. 3 shows an example of resource allocation wherein more than one transmission profiles relate to the signal, in accordance with the present disclosure. Map profiles 302, 304, 306 and 308 are identical to map profiles 202, 204, 206 and 208 respectively. In the present example, the signal to be transmitted is both a priority 7 transmission and a unicast transmission. Therefore, two transmission profiles (priority 7 transmission and unicast transmission) relate to the signal. The circuitry, based on the transmission profiles relating to the signal, may then use map profile 304 (corresponding to priority 7 transmission) and map profile 308 (corresponding to unicast transmission) for allocating a resource from the plurality of resources. This is possible by combining the required map profiles by, for example, mathematical combination, logic combination, or any other form of combination. In the present example, both map profiles 304 and 308 are combined mathematically such that a higher of each weighted value is used by the circuitry of the communication apparatus 106 for the resource allocation. The formula for the combination of each resource may be represented in the form as shown below:

$$P(L1\ \&L3) = \begin{cases} \text{Max}[P(L1), P(L3)], & \text{if } P(L1)*P(L3) \neq 0 \\ 0, & \text{if } P(L1)*P(L3) = 0 \end{cases}$$

Where P(L1) is the weighted value of a candidate resource in profile $L_1$;
P(L3) is the weighted value of a candidate resource in profile $L_3$;
P(L1&L3) is the weighted value of a candidate resource for a transmission belongs to both profile $L_1$ and profile $L_3$; and
Max [P(L1), P(L3)] is the higher weighted value of P(L1) and P(L2).

The combination of map profiles 304 and 308 may be represented by a combined map profile 310. Each element in the combined map profile 310 indicates a higher weighted value for each corresponding element in map profiles 304 and 306. For example, rectangle portion 324 of map profile 310 takes on the higher weighted value of 0.9 from rectangle portion 316 of map profile 308 instead of the weighted value of 0.1 from rectangle portion 312 of map profile 304. Similarly, rectangle portion 320 of map profile 310 takes on the higher weighted value of 0.9 from rectangle portion 314 of map profile 304, instead of the weighted value of 0.1 from rectangle portion 318 of map profile 308. Accordingly, the circuitry of communication apparatus 106 may then allocate a resource from the plurality of resources based on the combined map profile 310. It can be understood that the above-mentioned combination may also be performed by the base station 102 or the other UE 104, and then the combined map may be sent to the communication apparatus 106.

FIG. 4 shows an example of the resource allocation information indicating 2 maps 400 and 410. Similar to FIG. 1, each map comprises a plurality of map profiles, each map profile corresponding to a different transmission profile. The difference between the 2 maps 400 and 410 lie in the distribution of weighted values in the map profiles for priority 0 transmission. In map 410, more candidate resources are made available for a priority 0 transmission. For example, map profile 412 from map 410 has a greater distribution of higher weighted values than map profile 402 from map 400, as shown in the six "0.9" weighted values in rectangle portion 416 of map profile 412, compared to four "0.9" weighted values in rectangle portion 406 of map profile 402. Further, for priority 7 transmission, the elements in rectangle portion 418 of map profile 414 have a lower weighted value of 0.1 as compared to the usual weighted value of 0.9 as shown in rectangle portion 408 of map profile 404, meaning that the resources represented in rectangle portion 418 have a lower likelihood of being allocated for a priority 7 transmission. This means that for a priority 0 signal transmission, more candidate resources are available if map 410 is used instead of map 400. While 2 maps are shown in FIG. 4, it will be understood that it is possible for the resource allocation information to indicate more than 2 maps.

Based on the embodiment as shown in FIG. 4, the receiver of the communication apparatus 106 may receive resource allocation information from the base station 102 or the other UE(s) 104, the resource allocation information comprising maps 400 and 410. Alternatively, the resource allocation information may be configured in the communication apparatus 106. It can be understood that the gNB/base station 102 may send information relating to the resource pool to the communication apparatus 106, so that the communication apparatus 106 may configure the maps 400 and 410 and/or the map profiles for the resource pool accordingly. The circuitry of the communication apparatus 106 then identifies a map from maps 400 and 410 based on transmission information, wherein the transmission information may be indicative of radio environment conditions such as parameters or metrics of congestion level, CBR (Channel Busy Ratio), RSSI (Received signal strength indicator) or other service requirements. The transmission information may be received by the receiver of the communication apparatus 106 from the base station 102 or other UEs 104. Alternatively, the transmission information may be measurements of the radio environment conditions over the air by the communication apparatus 106. For example, the transmission information may indicate that there are more priority 0 transmissions over the air, such that collisions between priority 0 transmissions will be increased. Further, in the present example, the signal to be transmitted by the transmitter of the communication apparatus 106 is a priority 0 transmission. Based on the transmission information and transmission profile of the signal, the circuitry of the communication apparatus 106 selects or switches to the map 410 and applies the map profile 412 of the selected map 410 for resource allocation, since the map profile 412 corresponds to the transmission profile relating to the signal i.e. a priority 0 transmission. Advantageously, by selecting or switching to the map 410, more candidate resources are available for priority 0 transmissions as compared to using map 400. It will be understood that the map and map profiles can be switched/configured dynamically or semi-statically, by the communication apparatus 106 or via gNB signalling from the base station 102, according to the coordination between other UEs 104 or a randomized map choice for each of the other UEs and the communication apparatus 106.

Figure 5:
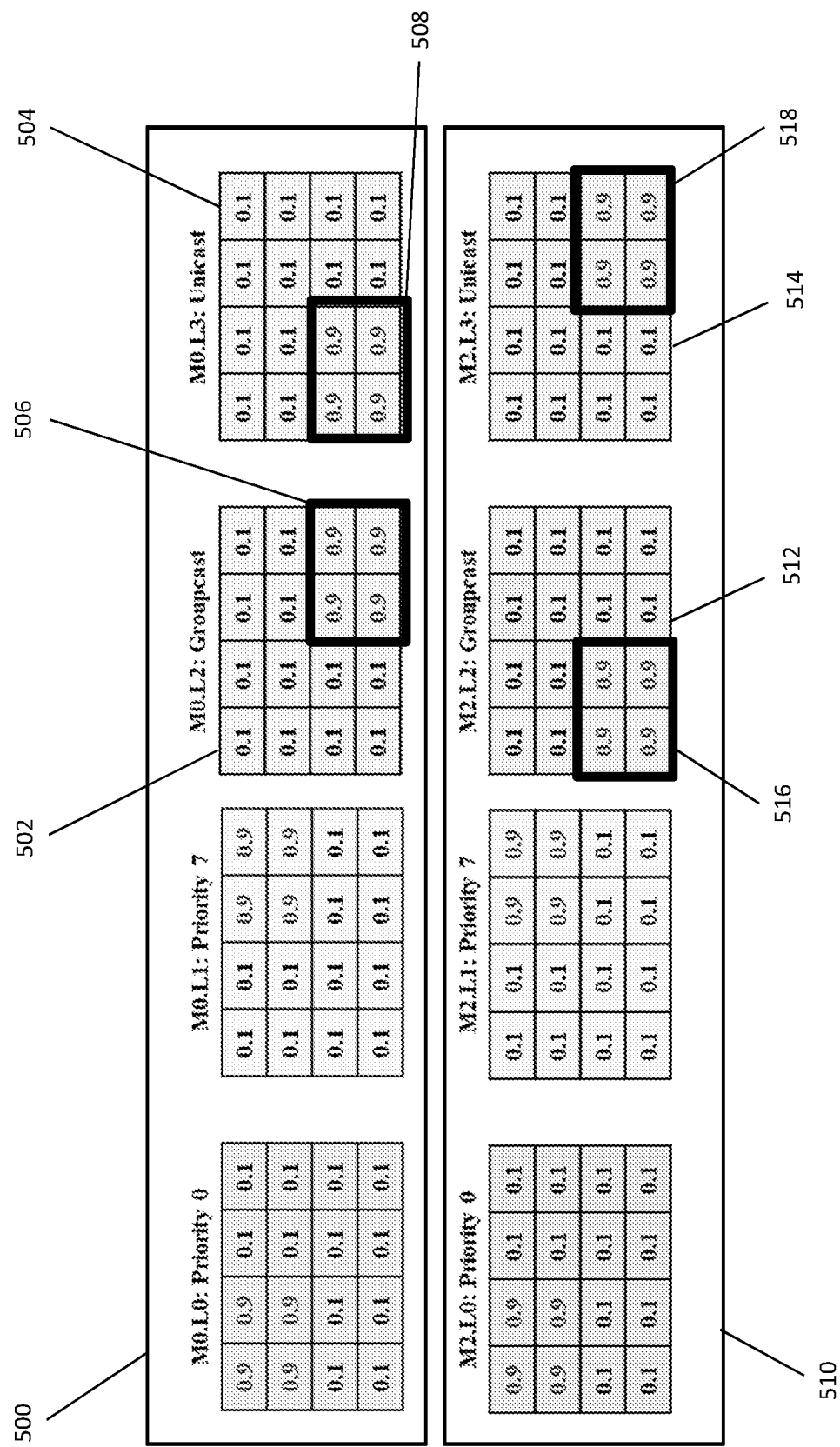
FIG. 5 shows an example of how a resource pool for a communication apparatus may be soft-segregated in accordance with a fourth embodiment of the 5G NR based V2X communications as shown in FIG. 1.

FIG. 5 shows another example of the resource allocation information comprising two maps 500 and 510. As can be seen in map profile 502 of map 500 and map profile 512 of map 510, there is a higher likelihood of allocating a resource represented by rectangle portion 506 for a groupcast transmission when map profile 502 is used, and there is a higher likelihood of allocating a resource represented by rectangle portion 516 for a groupcast transmission when map profile 512 is used. Similarly, there is a higher likelihood of allocating a resource represented by rectangle portion 508 for a unicast transmission when map profile 502 is used, and there is a higher likelihood of allocating a resource represented by rectangle portion 518 for a unicast transmission when map profile 514 is used.

Based on the embodiment as shown in FIG. 5, the receiver of the communication apparatus 106 may receive resource allocation information from the base station 102 or the other UE(s) 104, the resource allocation information comprising maps 500 and 510. Alternatively, the resource allocation information may be configured in the communication apparatus 106. It can be understood that the gNB/base station 102 may send information relating to the resource pool to the communication apparatus 106, so that the communication apparatus 106 may configure the maps 500 and 510 and/or the map profiles for the resource pool accordingly. The circuitry of the communication apparatus 106 then identifies a map from maps 500 and 510 based on transmission information, wherein the transmission information may be indicative of radio environment conditions such as parameters or metrics of congestion level, CBR (Channel Busy Ratio), RSSI (Received signal strength indicator) or other service requirements. The transmission information may be received by the receiver of the communication apparatus 106 from the base station 102 or other UEs 104. Alternatively, the transmission information may be measurements of the radio environment conditions over the air by the communication apparatus 106. For example, the transmission information may indicate that there are a lot of groupcast transmissions and few unicast transmissions over the air, where most of the groupcast transmission belong to a group 2 of UEs.

Assuming that the communication apparatus 106 is leader of a group 1 of UEs, wherein the signal to be transmitted is a groupcast transmission, the communication apparatus 106 may coordinate with the leader of group 2 for different maps within the configured map set. For example, it may be decided that UEs of group 1 will use map 500 for its groupcast transmission while UEs of group 2 will use map 510 for its groupcast transmission. Therefore, the receiver of the communication apparatus 106 may receive transmission information from the base station 102 or the leader UE of group 2 (represented by the other UE(s) 104), the transmission information indicating a map to be selected by the communication apparatus 106, which in this case is map 500. Alternatively, the transmission information may indicate one or more maps that the communication apparatus 106 should avoid selecting, which in this case is map 510. The communication apparatus 106, based on the transmission information and the transmission profile of the signal, thus selects map 500 and allocates a resource based on map profile 502 of the selected map 500. The transmitter of the communication apparatus 106 then transmits the groupcast signal to the target communication apparatus 108 using the allocated resource. The communication apparatus 106 may also communicate with all other group 1 UEs to select or switch to map 500 for their groupcast transmissions. Advantageously, as the group 2 UEs will allocate resources based on transmission profile 512 of map 500 for their groupcast transmissions, collisions between the groupcasts of group 1 and group 2 UEs may be avoided. It will be understood that the map and map profiles can be switched/configured dynamically or semi-statically, by the communication apparatus 106 or via gNB signalling from the base station 102, according to the coordination between other UEs 104 or a randomized map choice for each of the other UEs and the communication apparatus 106.

Figure 6:
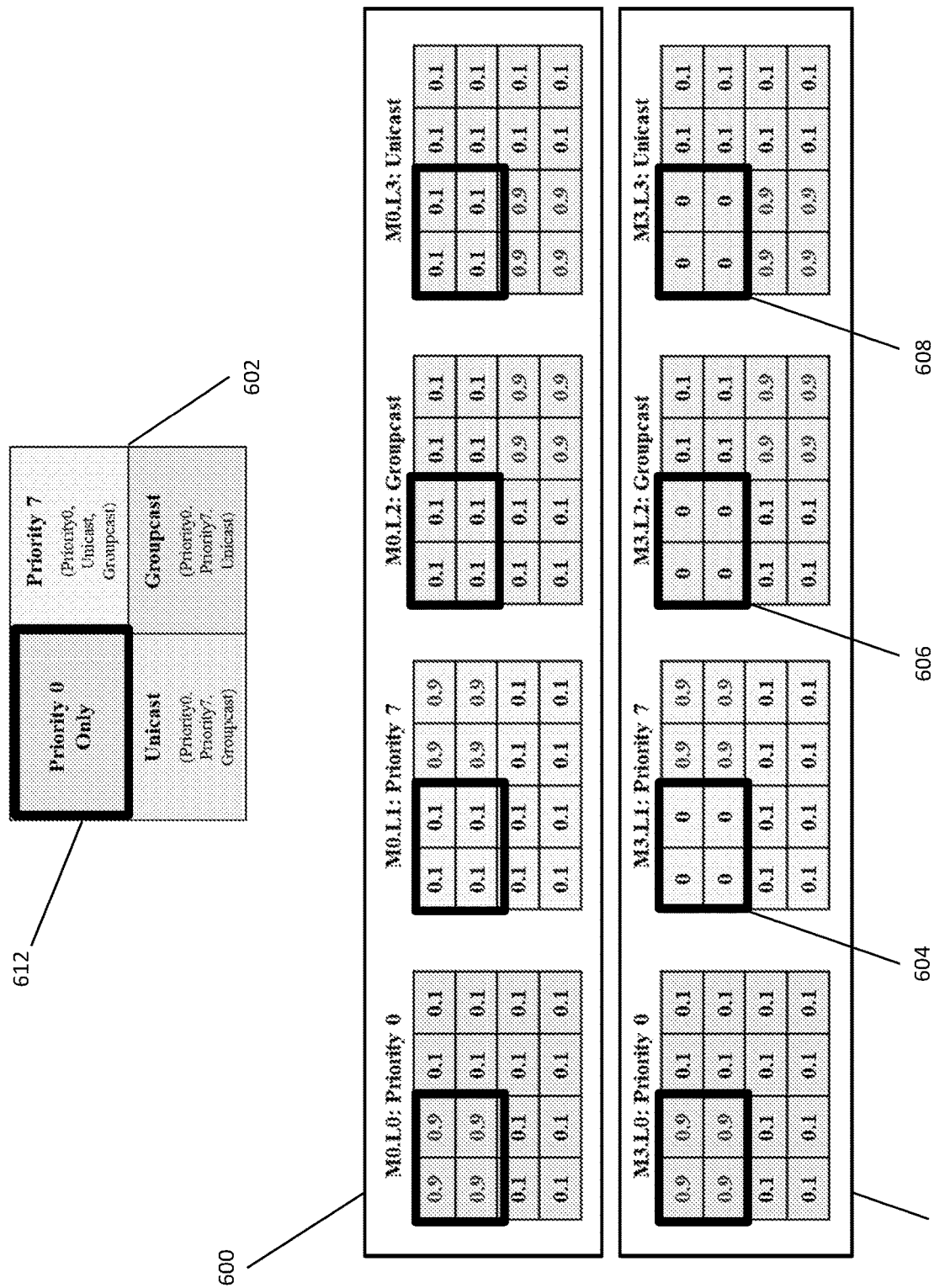
FIG. 6 shows an example of how a resource pool for a communication apparatus may be soft-segregated in accordance with a fifth embodiment of the 5G NR based V2X communications as shown in FIG. 1.

FIG. 6 shows an example of how a resource pool may be segregated to pre-empt certain usages. Map 600 is configured with the same soft-segregation arrangement shown in example template 210 of FIG. 2. On the other hand, map 610 is configured with a soft-segregation arrangement as shown in a template 602, whereby resources represented by elements in rectangle portion 612 of example template 602 are only available for priority 0 transmissions. Therefore, each of the elements in rectangle portions 604, 606 and 608 have a weighted value of zero. For example, when the communication apparatus 106 is to transmit a signal relating to a unicast transmission and the circuitry of the communication apparatus 106 allocates a resource for the signal transmission based on map 610, the resources represented by elements in rectangle portion 608 of the unicast map profile in map 610 will not be available for allocation by the circuitry of the communication apparatus 106. This is because the weighted values of the elements in rectangle portion 608 are all zero, indicating that the likelihood of allocating a resource from portion 608 is zero. Advantageously, there is a lesser chance of collision between priority 0 transmissions and other types of transmissions when map 610 is used.

Figure 7:
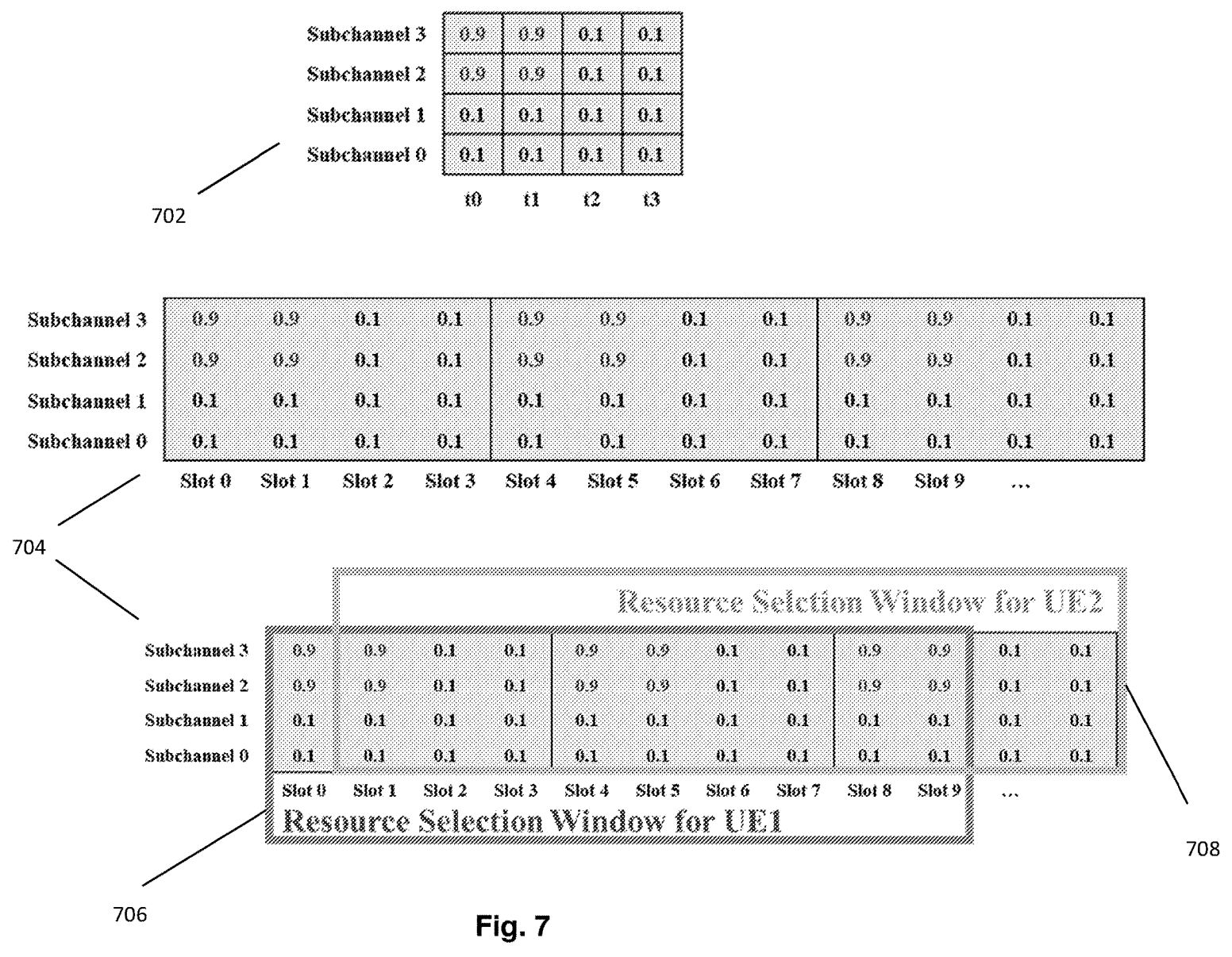

FIG. 7 shows an example of how a map profile 702 may be mapped to the plurality of resources. Each element of the map profile 702 is indicative of a weighted value for a resource in the plurality of resources, where each resource belongs to one of subchannel 0 to subchannel 3. Further, each time slot t0, t1, t2 and t3 represented in map profile 702 may be 0.5 milliseconds in time duration. The plurality of resources may be shared among the communication apparatus 106 and other UEs. The map profile 702 may be applied to the plurality of resources periodically with a fixed time reference for allocation of resources, regardless of the transmission profile relating to the signal. The fixed time reference may be determined by the base station 102 for all the UEs including the communication apparatus 106.

As shown in resource pool 704, the time interval of one candidate resource in map profile 702 can be mapped to at least one slot in resource pool 704, and the frequency segment of one candidate resource in map 702 can be mapped to at least one contiguous subchannel(s) in resource pool 704. The same fixed time reference i.e. at slot 0 of resource pool 704 is applied by the communication apparatus 106 and the other UEs sharing the plurality of resources for their resource allocation. As a result, every UE including the communication apparatus 106 may have the same or similar soft-segregation arrangement of resources regardless of transmission profile of the signal to be transmitted. However, each UE may use a different resource selection window for allocating a resource for their transmission. The starting time of the resource selection window of different UEs may be different. It is up to implementation considering the packet arrival time at MAC layer, in-device collision handling, etc. Further, the window size in time domain for each resource selection window may not necessarily be the same as well. For example, the communication apparatus may use resource selection window 706 that starts with a time offset of zero from the fixed time reference, while another UE may use a bigger resource selection window 708 that starts with a time offset of 0.5 milliseconds from the fixed time reference.

The receiver of the communication apparatus 106 may receive transmission information from the base station 102, the transmission information indicative of a fixed time reference. The circuitry of the communication apparatus 106 may then select a time offset. In the present example, the fixed time reference is at slot 0 and the time offset from the fixed time reference for the resource selection window 706 is zero. Therefore, the resource allocation information may then indicate, based on the selected time offset and the fixed time reference, a weighted value of each resource. The circuitry of the communication apparatus 106 may then allocate a resource based on the weighted values indicated by the allocation information, and the transmitter of the communication apparatus 106 transmits the signal using the allocated resource. It can be understood that the gNB/base station 102 may send information relating to the resource pool 704 to the communication apparatus 106, so that the communication apparatus 106 may configure the map profile 702 for the resource pool 704 accordingly.

FIG. 8 shows an example of dedicated signaling for transmitting resource allocation information from the base station 102 or the other UE(s) 104 to the communication apparatus 106, in accordance with the present disclosure. For RRC-Connected Mode-2 UEs such as the communication apparatus 106, the base station 102 can configure the map profiles (as shown in FIGS. 2 to 6) using RRC signaling, which can be carried by RRC information elements (either SIB (system information block) or RRCReconfiguration). The UEs may then apply the received map profiles for their sidelink resource selection. For example, a weightage template V2X-Weight-Map may be carried by RRC information elements (e.g., SIB, RRCReconfiguration, etc.) in a format as shown in weightage template message 800.

In the weightage template message 800, parameter V2X-Weight-Map 802 indicates a selected map from a plurality of maps, parameter V2X-WeightProfile 804 indicates a map profile based on the transmission profile relating to the signal, parameter V2X-WeightSubchannel 806 indicates a subchannel in which a candidate resource from the plurality of resources resides, and parameter WeightResourceCandidate 810 indicates a weightage value for a candidate resource from the plurality of resources. Such a template may be sent when the base station 102 receives enough periodical measurement reports from the communication apparatus 106 and/or other UEs, and/or receives service requests from the NAS (Non-access stratum) layer. The circuitry of the communication apparatus 106 may then allocate a resource from the plurality of resources based on the received weightage template message 800.

It can be understood that using the weightage template message 800, the transmission information may indicate only one map profile (e.g. 204 of FIG. 2) among a plurality of map profiles (e.g. 202, 204, 206 and 208 of FIG. 2). In another example, the transmission information may indicate more than one map profile (e.g. 202, 204, 206, 208 of FIG. 2) among a plurality of map profiles (e.g. 202, 204, 206 and 208 of FIG. 2). For example, if the transmission information may indicate more than one map profiles, the transmission information may include information indicating a first transmission profile, one or more weighted values for the first transmission profile, a second transmission profile and one or more weighted values for the second transmission profile and so on. Further, the resource allocation information may include one or more bits indicating a transmission profile and some bit(s) indicating one or more weighted values for the transmission profile.

Figure 9:
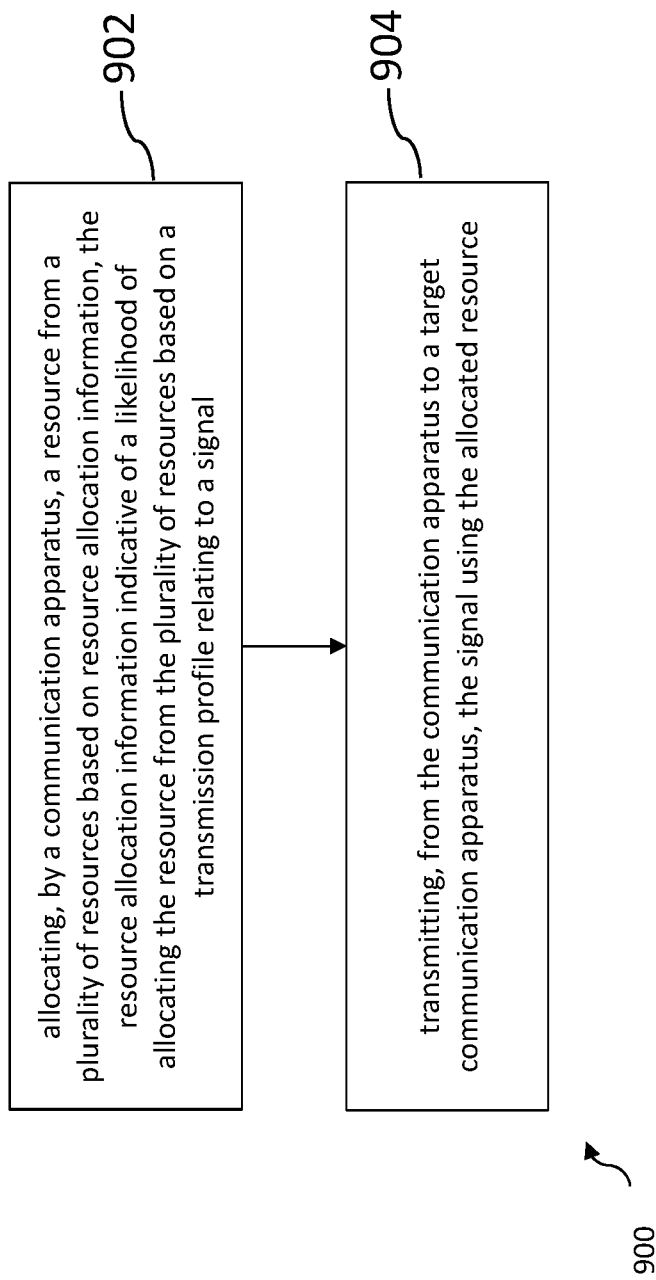
FIG. 9 shows a flow chart illustrating a communication method in accordance with various embodiments of the 5G NR based V2X communications as shown in FIG. 1.

FIG. 9 shows a flow chart 900 illustrating a communication method in accordance with various embodiments of the present disclosure. The communication method includes at least the following two steps:

Step 902—allocating, by a communication apparatus, a resource from a plurality of resources based on resource allocation information, the resource allocation information indicative of a likelihood of allocating the resource from the plurality of resources based on a transmission profile relating to a signal.

Step 904—transmitting, from the communication apparatus to a target communication apparatus, the signal using the allocated resource.

It will be understood that the map profiles as described in FIGS. 2 to 8 may also be applied to PHY (physical) layer sensing and reporting procedures. For example, as per TS36.213 section 14.1.1.6, a UE may sort all available "candidate single-subframe resource" using metric $E_{x,y}$, UEs with similar radio environments may have similar reported candidate single-subframe resource in a set $S_B$, which may overload the best 20% candidate single-subframe resource and increase the chance of over-the-air collision, considering that there could be more than 20% candidate single-subframe resources remaining in $S_A$. Therefore, the UE may conduct a weighted sorting for the candidate single-subframe resource remaining in $S_A$ using a map profile, the map profile being a (pre-) configured map of coefficients such as, for example, weighted values. Accordingly, the coefficient then may be multiplied with the metric $E_{x,y}$ of each candidate single-subframe resource for sorting.

It can be understood that the collision between different transmission types may be mitigated/avoided by the soft-segregation of resources, with potential trade-off that increase collision among same type transmissions. The trade-off can be ameliorated by proper map segregation and weightage value assignment, proper map timing reference points considering different UE resource selection windows, (re-)configuration of the map or map profiles according to over-the-air conditions, and other similar measures. Further, how the map profiles and weighted values are (pre-)configured may depend on at least one of the following: the regional regulator, chipset manufacturer, vehicle manufacturer, base station signaling, application layer configuration, and other similar factors. Different resource pool may have different map set for different transmission types, and there could be some overlap for different transmission types. For example, a resource pool 1 may be (pre-)configured with a map with map profiles for transmission types A, B, C and D, and a resource pool 2 is (pre-) configured with a map with map profiles for transmission types C, D, E and F.

Figure 10:
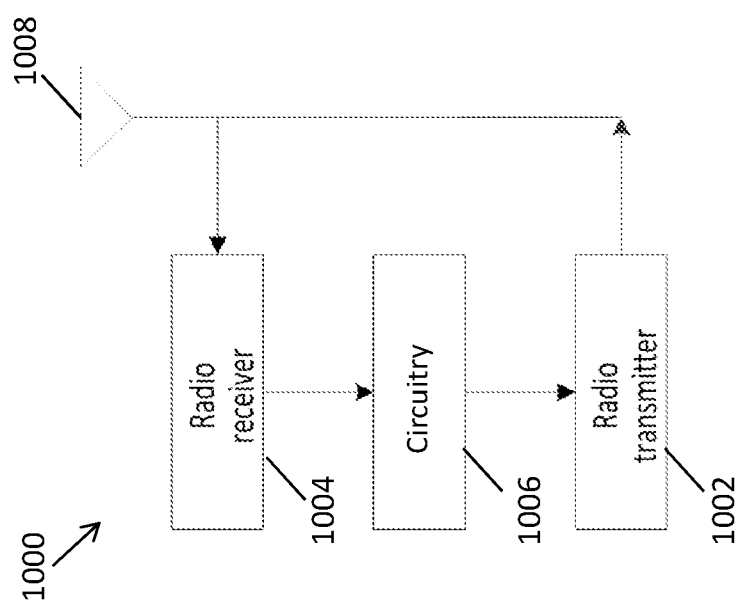
FIG. 10 shows a schematic example of a communication apparatus that can be implemented to establish the 5G NR based V2X communications in accordance with various embodiments as shown in FIGS. 1 to 9.

FIG. 10 shows a schematic, partially sectioned view of the communication apparatus 106 that can be implemented for establishing the 5G NR based V2X communications in accordance with various embodiments as shown in FIGS. 1 to 8.

Various functions and operations of the communication apparatus 106 are arranged into layers in accordance with a hierarchical model. In the model, lower layers report to higher layers and receive instructions therefrom in accordance with 3GPP 5G NR specifications. For the sake of simplicity, details of the hierarchical model are not discussed in the present disclosure.

As shown in FIG. 10, the communication apparatus 106 is typically provided with at least one radio transmitter 1002, at least one radio receiver 1004, at least one antenna 1008 and at least one circuitry 1006 for use in software and hardware aided execution of tasks it is designed to perform, including control of receipt of resource allocation information and/or transmission information from the base station 102 and/or communication apparatus 104 and/or transmission of a signal to the target communication apparatus 108. The data processing, storage and other relevant control apparatus can be provided on an appropriate circuit board and/or in chipsets. In various embodiments, when in operation, the at least one radio transmitter 1002, at least one radio receiver 1004 and at least one antenna 1008 may be controlled by the at least one circuitry 1006.

In some embodiments of the communication apparatus 106, the at least one circuitry 1006, when in operation, allocates a resource from a plurality of resources based on resource allocation information, the resource allocation information indicative of a likelihood of allocating the resource from the plurality of resources based on a transmission profile relating to a signal; and the at least one radio transmitter 1002, when in operation, transmits the signal to a target communication apparatus using the allocated resource.

In some embodiments of the communication apparatus 106, the at least one circuitry 1006, when in operation, allocates a resource from a plurality of resources based on resource allocation information, the resource allocation information indicative of a likelihood of allocating the resource from the plurality of resources based on a transmission profile relating to a signal, wherein the resource allocation information indicates a weighted value which is used to represent the likelihood of allocating the resource from the plurality of resources, wherein the weighted value is indicated by at least one bit of the resource allocation information; and the at least one radio transmitter 1002, when in operation, transmits the signal to a target communication apparatus using the allocated resource.

In some embodiments of the communication apparatus 106, the at least one circuitry 1006, when in operation, allocates a resource from a plurality of resources based on resource allocation information, the resource allocation information indicative of a likelihood of allocating the resource from the plurality of resources based on a transmission profile relating to a signal, wherein the resource allocation information indicates a weighted value which is used to represent the likelihood of allocating the resource from the plurality of resources, the weighted value being indicated by at least one bit of the resource allocation information, each weighted value being greater than zero so that each resource of the plurality of resources is available for allocation, and wherein a higher weighted value indicates a higher chance of the resource being allocated; and the at least one radio transmitter 1002, when in operation, transmits the signal to a target communication apparatus using the allocated resource.

In some embodiments of the communication apparatus 106, the at least one circuitry 1006, when in operation, allocates a resource from a plurality of resources based on resource allocation information, the resource allocation information indicative of a likelihood of allocating the resource from the plurality of resources based on a transmission profile relating to a signal, wherein the resource allocation information indicates a weighted value which is used to represent the likelihood of allocating the resource from the plurality of resources, the weighted value being indicated by at least one bit of the resource allocation information, wherein a weighted value of zero indicates that the resource will not be allocated; and the at least one radio transmitter 1002, when in operation, transmits the signal to a target communication apparatus using the allocated resource.

In some embodiments of the communication apparatus 106, the at least one circuitry 1006, when in operation, allocates a resource from a plurality of resources based on resource allocation information, the resource allocation information indicative of a likelihood of allocating the resource from the plurality of resources based on a transmission profile relating to a signal, wherein the resource allocation information indicates a plurality of weighted values for each resource of the plurality of resources, each weighted value of the plurality of weighted values indicating a likelihood of allocating a resource based on a corresponding transmission profile; and the at least one radio transmitter 1002, when in operation, transmits the signal to a target communication apparatus using the allocated resource.

In some embodiments of the communication apparatus 106, the at least one circuitry 1006, when in operation, allocates a resource from a plurality of resources based on resource allocation information, the resource allocation information indicative of a likelihood of allocating the resource from the plurality of resources based on a transmission profile relating to a signal, wherein the resource allocation information comprises a plurality of maps, wherein each map of the plurality of maps comprises a plurality of weighted values for the plurality of resources, each weighted value of the plurality of weighted values indicating a likelihood of allocating a resource based on a corresponding transmission profile; and the at least one radio transmitter 1002, when in operation, transmits the signal to a target communication apparatus using the allocated resource.

In some embodiments of the communication apparatus 106, the at least one radio receiver 1004, when in operation, receives the resource allocation information from a base station or another communication apparatus.

In some embodiments of the communication apparatus 106, when the resource allocation information indicates a low likelihood for a resource, the at least one circuitry 1006, when in operation, allocates another resource of the plurality of resources.

In some embodiments of the communication apparatus 106, when the resource allocation information comprises a plurality of maps, wherein each map of the plurality of maps comprises a plurality of weighted values for the plurality of resources, each weighted value of the plurality of weighted values indicating a likelihood of allocating a resource based on a corresponding transmission profile, the at least one radio receiver 1004, when in operation, receives transmission information from a base station or one or more other communication apparatuses, the transmission information indicating one or more maps to avoid selecting; and the at least one circuitry 1006, when in operation, selects a map from the plurality of maps, the selected map being different from the indicated one or more maps.

In some embodiments of the communication apparatus 106, when the resource allocation information comprises a plurality of maps, wherein each map of the plurality of maps comprises a plurality of weighted values for the plurality of resources, each weighted value of the plurality of weighted values indicating a likelihood of allocating a resource based on a corresponding transmission profile, the at least one radio receiver 1004, when in operation, receives transmission information from a base station or one or more other communication apparatuses, the transmission information indicating a map to be selected; and the at least one circuitry 1006, when in operation, selects a map from the plurality of maps, the selected map being the same as the indicated map.

In some embodiments of the communication apparatus 106, the at least one circuitry 1006, when in operation, allocates a resource from a plurality of resources based on resource allocation information, the resource allocation information indicative of a likelihood of allocating the resource from the plurality of resources based on a transmission profile relating to a signal, wherein the resource allocation information comprises a plurality of maps, wherein each map of the plurality of maps comprises a plurality of weighted values for the plurality of resources, each weighted value of the plurality of weighted values indicating a likelihood of allocating a resource based on a corresponding transmission profile, wherein the resource allocation information indicates a weighted value of the plurality of weighted values based on more than one transmission profiles, the weighted value being used to represent the likelihood of allocating the resource from the plurality of resources; and the at least one radio transmitter 1002, when in operation, transmits the signal to a target communication apparatus using the allocated resource.

In some embodiments of the communication apparatus 106, the at least one circuitry 1006, when in operation, allocates a resource from a plurality of resources based on resource allocation information, the resource allocation information indicative of a likelihood of allocating the resource from the plurality of resources based on a transmission profile relating to a signal, the resource allocation information indicating a weighted value based on a time offset from a fixed time reference, the weighted value being used to represent the likelihood of allocating the resource from the plurality of resources; and the at least one radio transmitter 1002, when in operation, transmits the signal to a target communication apparatus using the allocated resource.

In some embodiments of the communication apparatus 106, the at least one radio receiver 1004, when in operation, receives transmission information from a base station, the transmission information indicative of a fixed time reference; the at least one circuitry 1006, when in operation, selects a time offset, allocates a resource from a plurality of resources based on resource allocation information, the resource allocation information indicative of a likelihood of allocating the resource from the plurality of resources based on a transmission profile relating to a signal, the resource allocation information indicating a weighted value based on the selected time offset from the fixed time reference, the weighted value being used to represent the likelihood of allocating the resource from the plurality of resources; and the at least one radio transmitter 1002, when in operation, transmits the signal to a target communication apparatus using the allocated resource.

Figure 11:
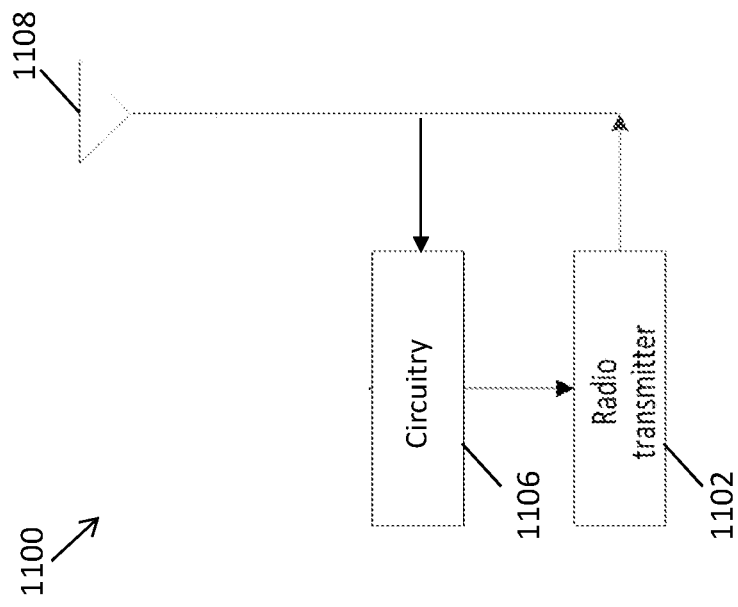
FIG. 11 shows a schematic example of a base station that can be implemented to establish the 5G NR based V2X communications in accordance with various embodiments as shown in FIGS. 1 to 9.

FIG. 11 shows a schematic, partially sectioned view of the base station 102 that can be implemented for establishing the 5G NR based V2X communications in accordance with various embodiments as shown in FIGS. 1 to 8.

Various functions and operations of the base station 102 are arranged into layers in accordance with a hierarchical model. In the model, lower layers report to higher layers and receive instructions therefrom in accordance with 3GPP 5G NR specifications. For the sake of simplicity, details of the hierarchical model are not discussed in the present disclosure.

As shown in FIG. 10, the base station 102 is typically provided with at least one radio transmitter 1102, at least at least one antenna 1108 and at least one circuitry 1106 for use in software and hardware aided execution of tasks it is designed to perform, including control of transmission of resource allocation information and/or transmission information to the communication apparatus 106. The data processing, storage and other relevant control apparatus can be provided on an appropriate circuit board and/or in chipsets. In various embodiments, when in operation, the at least one radio transmitter 1102 and at least one antenna 1108 may be controlled by the at least one circuitry 1106.

In some embodiments of the base station 102, the at least one radio transmitter 1102, when in operation, transmits resource allocation information to a communication apparatus 106, the resource allocation information indicative of a likelihood of allocating the resource from the plurality of resources based on a transmission profile relating to a signal.

In some embodiments of the base station 102, the at least one radio transmitter 1102, when in operation, transmits resource allocation information to a communication apparatus 106, the resource allocation information indicative of a likelihood of allocating the resource from the plurality of resources based on a transmission profile relating to a signal, wherein the resource allocation information indicates a weighted value which is used to represent the likelihood of allocating the resource from the plurality of resources, wherein the weighted value is indicated by at least one bit of the resource allocation information.

In some embodiments of the base station 102, the at least one radio transmitter 1102, when in operation, transmits resource allocation information to a communication apparatus 106, the resource allocation information indicative of a likelihood of allocating the resource from the plurality of resources based on a transmission profile relating to a signal, wherein the resource allocation information indicates a weighted value which is used to represent the likelihood of allocating the resource from the plurality of resources, wherein the weighted value is indicated by at least one bit of the resource allocation information, each weighted value being greater than zero so that each resource of the plurality of resources is available for allocation.

In some embodiments of the base station 102, the at least one radio transmitter 1102, when in operation, transmits resource allocation information to a communication apparatus 106, the resource allocation information indicative of a likelihood of allocating the resource from the plurality of resources based on a transmission profile relating to a signal, wherein the resource allocation information indicates a weighted value which is used to represent the likelihood of allocating the resource from the plurality of resources, wherein the weighted value is indicated by at least one bit of the resource allocation information, each weighted value being greater than zero so that each resource of the plurality of resources is available for allocation, and wherein a higher weighted value indicates a higher chance of the resource being allocated.

In some embodiments of the base station 102, the at least one radio transmitter 1102, when in operation, transmits resource allocation information to a communication apparatus 106, the resource allocation information indicative of a likelihood of allocating the resource from the plurality of resources based on a transmission profile relating to a signal, wherein the resource allocation information indicates a weighted value which is used to represent the likelihood of allocating the resource from the plurality of resources, the weighted value being indicated by at least one bit of the resource allocation information, wherein a weighted value of zero indicates that the resource will not be allocated.

In some embodiments of the base station 102, the at least one radio transmitter 1102, when in operation, transmits resource allocation information to a communication apparatus 106, the resource allocation information indicative of a likelihood of allocating the resource from the plurality of resources based on a transmission profile relating to a signal, wherein the resource allocation information indicates a plurality of weighted values for each resource of the plurality of resources, each weighted value of the plurality of weighted values indicating a likelihood of allocating a resource based on a corresponding transmission profile.

In some embodiments of the base station 102, the at least one radio transmitter 1102, when in operation, transmits resource allocation information to a communication apparatus 106, the resource allocation information indicative of a likelihood of allocating the resource from the plurality of resources based on a transmission profile relating to a signal, wherein the resource allocation information comprises a plurality of maps, wherein each map of the plurality of maps comprises a plurality of weighted values for the plurality of resources, each weighted value of the plurality of weighted values indicating a likelihood of allocating a resource based on a corresponding transmission profile.

In some embodiments of the base station 102, when the resource allocation information comprises a plurality of maps, wherein each map of the plurality of maps comprises a plurality of weighted values for the plurality of resources, each weighted value of the plurality of weighted values indicating a likelihood of allocating a resource based on a corresponding transmission profile, the at least one radio transmitter 1102, when in operation, transmits transmission information indicating one or more maps to avoid selecting to the communication apparatus 106.

In some embodiments of the base station 102, when the resource allocation information comprises a plurality of maps, wherein each map of the plurality of maps comprises a plurality of weighted values for the plurality of resources, each weighted value of the plurality of weighted values indicating a likelihood of allocating a resource based on a corresponding transmission profile, the at least one radio transmitter 1102, when in operation, transmits transmission information indicating a map to be selected to the communication apparatus 106.

In some embodiments of the base station 102, the at least one radio transmitter 1102, when in operation, transmits resource allocation information to the communication apparatus 106, the resource allocation information indicative of a likelihood of allocating a resource from a plurality of resources based on a transmission profile relating to a signal, the resource allocation information indicating a weighted value based on a time offset from a fixed time reference, the weighted value being used to represent the likelihood of allocating the resource from the plurality of resources.

In some embodiments of the base station 102, the at least one radio transmitter 1102, when in operation, transmits resource allocation information and transmission information to the communication apparatus 106, the resource allocation information indicative of a likelihood of allocating a resource from a plurality of resources based on a transmission profile relating to a signal, the resource allocation information indicating a weighted value based on a time offset from a fixed time reference, the weighted value being used to represent the likelihood of allocating the resource from the plurality of resources, and the transmission information indicative of a fixed time reference.

It can be understood that the gNB/base station 102 may also transmit, via the transmitter 1102, information relating to the resource pool to the communication apparatus 106, so that the communication apparatus 106 may configure the map and/or map profiles for the resource pool accordingly.

As described above, the embodiments of the present disclosure provides an advanced communication system, communication methods and communication apparatuses that enables soft-segregation of resource pool for V2X communication apparatuses that advantageously allows the communication apparatus to mitigate or to avoid collisions in resource allocation.

The present disclosure can be realized by software, hardware, or software in cooperation with hardware. Each functional block used in the description of each embodiment described above can be partly or entirely realized by an LSI such as an integrated circuit, and each process described in the each embodiment may be controlled partly or entirely by the same LSI or a combination of LSIs. The LSI may be individually formed as chips, or one chip may be formed so as to include a part or all of the functional blocks. The LSI may include a data input and output coupled thereto. The LSI here may be referred to as an IC, a system LSI, a super LSI, or an ultra LSI depending on a difference in the degree of integration. However, the technique of implementing an integrated circuit is not limited to the LSI and may be realized by using a dedicated circuit, a general-purpose processor, or a special-purpose processor. In addition, a FPGA (Field Programmable Gate Array) that can be programmed after the manufacture of the LSI or a reconfigurable processor in which the connections and the settings of circuit cells disposed inside the LSI can be reconfigured may be used. The present disclosure can be realized as digital processing or analogue processing. If future integrated circuit technology replaces LSIs as a result of the advancement of semiconductor technology or other derivative technology, the functional blocks could be integrated using the future integrated circuit technology. Biotechnology can also be applied.

The present disclosure can be realized by any kind of apparatus, device or system having a function of communication, which is referred as a communication apparatus.

The communication apparatus may comprise a transceiver and processing/control circuitry. The transceiver may comprise and/or function as a receiver and a transmitter. The transceiver, as the transmitter and receiver, may include an RF (radio frequency) module including amplifiers, RF modulators/demodulators and the like, and one or more antennas.

Some non-limiting examples of such communication apparatus include a phone (e.g, cellular (cell) phone, smart phone), a tablet, a personal computer (PC) (e.g, laptop, desktop, netbook), a camera (e.g, digital still/video camera), a digital player (digital audio/video player), a wearable device (e.g, wearable camera, smart watch, tracking device), a game console, a digital book reader, a telehealth/telemedicine (remote health and medicine) device, and a vehicle providing communication functionality (e.g., automotive, airplane, ship), and various combinations thereof.

The communication apparatus is not limited to be portable or movable, and may also include any kind of apparatus, device or system being non-portable or stationary, such as a smart home device (e.g, an appliance, lighting, smart meter, control panel), a vending machine, and any other "things" in a network of an "Internet of Things (IoT)".

The communication may include exchanging data through, for example, a cellular system, a wireless LAN system, a satellite system, etc., and various combinations thereof.

The communication apparatus may comprise a device such as a controller or a sensor which is coupled to a communication device performing a function of communication described in the present disclosure. For example, the communication apparatus may comprise a controller or a sensor that generates control signals or data signals which are used by a communication device performing a communication function of the communication apparatus.

The communication apparatus also may include an infrastructure facility, such as a base station, an access point, and any other apparatus, device or system that communicates with or controls apparatuses such as those in the above non-limiting examples.

It will be appreciated by a person skilled in the art that numerous variations and/or modifications may be made to the present disclosure as shown in the specific embodiments without departing from the spirit or scope of the disclosure as broadly described. The present embodiments are, therefore, to be considered in all respects illustrative and not restrictive.

The invention claimed is:

1. A communication apparatus comprising:
circuitry, which, in operation, allocates a resource from a plurality of resources based on resource allocation information, wherein the resource allocation information indicates a weighted value which is used to represent a likelihood of allocating the resource from the plurality of resources based on a transmission profile relating to a signal, wherein the weighted value is indicated by at least one bit of the resource allocation information, and wherein a weighted value of zero indicates that the resource will not be allocated; and a transmitter, which, in operation, transmits the signal to a target communication apparatus using the allocated resource.

2. A communication apparatus, comprising:

circuitry, which, in operation, allocates a resource from a plurality of resources based on resource allocation information, wherein the resource allocation information indicates a weighted value which is used to represent a likelihood of allocating the resource from the plurality of resources based on a transmission profile relating to a signal, wherein the weighted value is indicated by at least one bit of the resource allocation information, wherein a lower weighted value indicates a higher chance of the resource being allocated, and wherein a weighted value of zero indicates a highest chance of the resource being allocated; and a transmitter, which, in operation, transmits the signal to a target communication apparatus using the allocated resource.

3. A communication method comprising:

allocating, by a communication apparatus, a resource from a plurality of resources based on resource allocation information, wherein the resource allocation information indicates a weighted value which is used to represent a likelihood of allocating the resource from the plurality of resources based on a transmission profile relating to a signal, wherein the weighted value is indicated by at least one bit of the resource allocation information, and wherein a weighted value of zero indicates that the resource will not be allocated; and transmitting, from the communication apparatus to a target communication apparatus, the signal using the allocated resource.

* * * * *